United States Patent Office 3,594,212
Patented July 20, 1971

3,594,212
TREATMENT OF FIBROUS MATERIALS WITH MONTMORILLONITE CLAYS AND POLYAMINES AND POLYQUATERNARY AMMONIUM COMPOUNDS
Le Roy T. Ditsch, Minneapolis, Minn., assignor to General Mills, Inc.
No Drawing. Filed Mar. 25, 1968, Ser. No. 715,542
Int. Cl. B44d 1/44; C08h 17/06
U.S. Cl. 117—62   17 Claims

ABSTRACT OF THE DISCLOSURE

Cotton fibrous materials are treated with an alkali metal or acid montmorillonite clay and with a polyamine or polyquaternary ammonium compound. The treatments can be repeated yielding products of increased softness. Some of such products have increased clay retention and various of the products can be further treated with functional anionic or cationic organic compounds such as germicides, dyes and so forth.

The present invention relates to the treatment of fibrous materials with montmorillonite clays and polyamines and polyquaternary ammonium compounds. In a preferred embodiment, it relates to such treatment and the resulting products wherein more of the clay is retained by the fibrous materials than possible by treating the same with the clay alone. In another preferred embodiment, it relates to such treatment wherein the amine used is a polyimine. It further relates to the additional treatments of various of the impregnated fibrous materials with cationic organic compounds or anionic organic compounds.

I recently discovered that cellulosic fibrous materials could be softened by treatment with an alkali metal or acid montmorillonite clay. In such procedure, the fibrous materials are impregnated with an aqueous dispersion of the clay and the resulting fabric or the like retains a certain amount of the clay to provide the softening. While the fabric can be treated with various amounts of the clay, the same ordinarily retains only about 0.1 to 0.2% by weight of the clay after repeated washings. It was thus considered to be desirable to find a way to increase the amount of clay retained by the fibrous materials and correspondingly increase the degree of softening of such materials.

I have now discovered that the amount of alkali metal or acid montmorillonite clay retained by fibrous materials can be greatly increased by also treating the said materials with a polyamine or a polyquaternary ammonium compound.

Any of the alkali metal montmorillonite clays can be used in my process but the sodium clays are preferred over the lithium and potassium clays for example. It is also to be understood that the alkali metal montmorillonites occur naturally in an impure form, that is they are mixed with other clay materials. Such mixtures containing substantial amounts of the montmorillonite clays are suitable in the practice of the invention and are included in the term alkali metal montmorillonte clay. Of course, the alkali metal montmorillonites can also be used in various purified forms if desired. The acid (or hydrogen) clays are easily obtained by passing an aqueous suspension of the alkali metal clays through a column containing the hydrogen form of a cation exchange resin.

Any polyamine or polyquaternary ammonium compound that is water soluble or dispersible can be used in the present invention. An especially preferred group of such compounds are the polyimines. The water dispersible or soluble polyethylene imines and polypropylene imines have the formula:

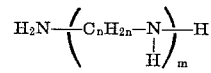

wherein $n$ is either 2 or 3 and $m$ is a whole number of about 2 to about 1500. Preferably such polyalkylene imines are the polyethylene imines and $m$ is preferably about 50 to about 250.

Other representative polyamines which can also be used are those having the formula:

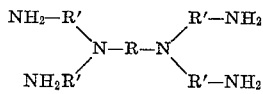

where R is an alkylene group of 1 to 50 or more carbon atoms, preferably 1 to 10 carbon atoms, and R' is an alkylene radical of 2 to 10 carbon atoms, preferably 2 to about 5 carbon atoms. The dispersibility or solubility of any of the polyamines can be improved by partial or total reaction with acids such as HCl and the like. The quaternary ammonium compounds can be based on any of the various polyamines. In this regard, the quaternaries of the described polyalkylene imines can have the formula:

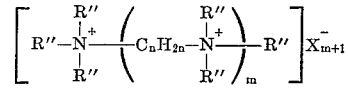

where R'' is an organic radical, preferably short chain alkyl—i.e. 1 to 4 carbon atoms, and X⁻ is a quaternary ammonium anion, preferably Cl⁻.

The fibrous materials are treated in accordance with my invention by (1) impregnating the same with an aqueous dispersion of the clay, followed by (2) impregnation with an aqueous solution or dispersion of the polyamine or polyquaternary ammonium compound. According to the preferred aspect of the present invention, the fibrous materials are then further (3) impregnated with the aqueous clay dispersion. The latter two steps (2) and (3) can be repeated any number of times and, with each such treatment, the amount of clay retained by the fibrous material is increased. In this preferred aspect, there is nothing critical about the number of times the treatment is repeated and the same is governed only by the ultimate clay content desired. Preferably, the fibrous materials are subjected to 1 to about 10 of such alternating impregnations. While I do not fully understand the reasons for the increased clay retention, it is theorized that the polyamine or polyquaternary ammonium compound attaches to the clay on the fabric and then provides additional reactive sites for attachment of further amounts of clay.

The impregnations can be accomplished by various means including spraying of the corresponding dispersions and/or solutions onto the fibrous materials. Preferably, however, the impregnations are accomplished by immersing the fibrous material in the aqueous dispersions or solutions. Such procedure more easily gives the desired reasonably uniform distribution of the clay and polyamine or polyquaternary ammonium compound on the fibrous materials. The concentration of the clay and polyamine or polyquaternary ammonium compound in the aqueous media is not critical and is preferably less than about 10% by weight. An especially preferred range is 0.25 to 5.0% by weight. The treatments can be carried out at various temperatures and pressures. Room temperature and atmospheric pressure are entirely suitable. Elevated temperatures of up to about 100° C. (at atmospheric pressure) can also be used where desired. It is to be understood that temperature and pressure are not critical so long as the dispersion or solution remains fluid. The treatment period is also not critical, it being only necessary to obtain a reasonably uniform distribution of the treating agents on the fibrous materials.

Treatment times of a minute or so to an hour or more are entirely suitable. Optionally, the fibrous materials can be rinsed with water after each or any of the treatments. They can also be dried at the completion of any one or all of the impregnation steps. Such drying can be accomplished by conventional means including dryers and air drying.

In one aspect of the present invention, the treatment is terminated after step (2) or any subsequent impregnation with the polyamine or polyquaternary ammonium compound. In this feature there are preferably at least two clay impregnations and two polyamine or polyquaternary impregnations. The treated fibrous material is then not only softened but is capable of being treated with a functional anionic organic compound such as a germicide, acid dye and the like. The presence of the polyamide or polyquaternary provides sites for the retention of the functional anionic organic compounds.

Where the clay impregnation is repeated two or more times, the amount of clay retained by the fibrous materials will be in excess of that retained without the use of the polyamine or polyquaternary ammonium compound. Generally, the amount of clay retained will be about 0.1 to about 0.2% where one clay impregnation is used and above 0.2% and preferably up to about 5.0% by weight based on the dry weight of the fibrous materials where two or more clay impregnations are used. The polyamine or polyquaternary ammonium compound is used in an amount sufficient to satisfy at least a portion of the base exchange capacity (about 60–130) of the clay. Preferably, such compounds will be used in an amount sufficient to at least fully satisfy the base exchange capacity of the clay. Accordingly, minute amounts up to several weight percent based on the dry weight of the fibrous material will increase the retention of the clay by the fibrous material and/or provide sites for the retention of functional anionic organic compounds. Preferably, the polyamine or polyquaternary ammonium compound will be used in an amount of 0.1 to 1.0% by weight based on the dry weight of the fibrous material in each impregnation step.

Representative functional anionic organic compounds are anionic germicides and acid dyes. Illustrative of the former are straight chain aliphatic carboxylic acids, especially those containing 8 to 12 carbon atoms, soaps of such acids, ring-substituted benzoylacrylic acids such as para-hexyl benzoylacrylic acid, long chain thiomatic acids, dioctyl sulfosuccinate and the like. These and other useful anionic organic germicides are described in "Surface Active Agents and Detergents" by Schwartz et al., vol. II, 1958, pp. 228–232, which disclosure is incorporated herein by reference.

Typical of the acid dyes are the following: Nigrosine O2P, Nigrosine OPX Dustless, Nigrosine J, Acid Blue R, Acid Blue B, Acid Blue 2R, Acid Blue 3B, Acid Blue 2G, Quinizol Blue BP, Bond Blue B Conc., Acid Green 2G Conc. Dustless, Acid Orange Y Dustless, Acid Green Extra Conc., Acid Orange RR Dustless, Azo Scarlet Y Extra Conc., Crocein Scarlet MOO Conc. Dustless, Crocein Scarlet MOON, Serisine B, Fast Red Conc. Acid Carminette, Fast Acid Carminette SC, Metanil Yellow MXXX Conc. Dustless, Acid Violet 4BNS Dustless, Acid Violet 6B Conc., Chinoline Yellow W Conc. and the like. These and other acid dyes are disclosed in "Dyestuff Data For Paper Makers," American Cyanamid Company, 1952, pp. 17–21 and 25–30 and in "University of Maine Lectures On Pulp and Paper Manufacture," 1950, pp. 241–245, the disclosures of which are incorporated herein by reference.

The following examples are illustrative of the present invention and are not to be considered as limiting. All parts and percentages are by weight unless otherwise indicated.

EXAMPLE I

Four one foot by three foot prewashed swatches of white cloths were cut into 12 4″ x 4″ pieces and then given to a panel for testing of their softness. The panel consisted of 12 members who tested in duplicate to equal 24 testers for each pair of cloths (identified only by code letters and numbers). They were asked to select the softer sample in each pair and the results are set forth in the following table:

TABLE

| Pair | Total times— | | Times chosen softer | |
|---|---|---|---|---|
| | Washed | Tested | Control | Treated |
| Control vs. clay treated | 1 | 24 | 3 | 21 |
| Do | 15 | 24 | 10 | 14 |
| Do | 26 | 24 | 11 | 13 |
| Control vs. clay-polyethylene imine treated | 1 | 24 | 3 | 21 |
| Do | 15 | 24 | 5 | 19 |
| Do | 26 | 24 | 8 | 16 |

The above data show that the cloths treated according to the present invention are significantly softer after repeated washings than cloths treated only with the montmorillonite clay.

EXAMPLE II

Prewashed swatches of cotton cloth as used in Example I were treated as follows:

(A) One swatch was retained as the control.

(B) One swatch was soaked for five minutes in a stirred 1% sodium bentonite dispersion as used in Example I, rinsed in a beaker with cold tap water for three minutes and dried in an oven at 27° C.

(C) One swatch was treated as in B except that it was not dried after rinsing. Instead it was soaked in a 0.5% aqueous solution of polyethylene imine as used in Example I for five minutes, rinsed in a beaker with cold tap water for three minutes, treated a second time with the clay dispersion for five minutes, rinsed a third time and dried in an oven at 27° C.

(D) One swatch was treated as in C but the clay treatment was repeated six times with five alternating polyethylene imine treatments. The cloth was rinsed in between treatments and after the final clay treatment as in D and then dried in an oven at 27° C.

The ash contents of the above cloths were then determined and the results are as follows:

Ash percent by wt.
A. (Control) _____ 0.19
B. (Clay treatment) _____ 0.41
C. (Clay-polyethylene imine-clay treatment) _____ 1.14
D. (6 clay, 5 polyethylene imine treatments) _____ 3.84

The above data show that the polyethylene imine substantially increases the clay retention by the fibrous materials.

EXAMPLE III

Example II was essentially repeated except that a 1% by weight aqueous solution of diethylene triamine was used in place of the relatively high molecular weight polyethylene imine solution and in part D, 4 clay treatments and three polyamine treatments were used. The ash contents of the cloths were determined and the results are as follows:

Ash percent by wt.
A. (Control) _____ 0.24
B. (Clay treatment) _____ 0.61
C. (Clay-diethylene triamine-clay treatment) _____ 0.74
D. (4 clay, 3 diethylene triamine treatments) _____ 0.85

EXAMPLE IV

Example III was repeated except that a 1.0% by weight aqueous solution of triethylene tetramine was used in place of the diethylene triamine solution. Results were as follows:

Ash percent by wt.
A. (Control—Exp. III) _____ 0.24
B. (Clay treatment Exp. III) _____ 0.61
C. (Clay-triethylene tetramine-clay treatment) ___ 0.90
D. (4 clay, 3 triethylene tetramine treatments) ____ 1.15

The data of Examples III and IV show that the low molecular weight polyamines also significantly increase the clay retention by the fibrous materials.

While my invention has been illustrated specifically above in regard to the treatment of cellulosic fibrous materials, it can be used generally on any fibrous materials which are capable of reacting with or in some way bonding with the montmorillonite clay. Illustrative of these various other fibers are nylon, Orlon and Dacron.

My invention also has value where the fibrous materials are to be treated with additional functional cationic organic compounds. Thus it was recently discovered that fibrous materials treated with an alkali metal or acid montmorillonite clay could be readily dyed with cationic dyes. It was also recently discovered that such treated fibrous materials could also be treated with a cationic germicide and the effective life of the same would be extended. It was further discovered that this ability of the clay treated fibrous materials was effective with cationic organic compounds generally. Since in the preferred aspect of my treatment process the clay content of the fibrous materials is increased, it is evident that it provides products which can also be treated with the functional cationic organic compounds which compounds will be retained to a substantial degree.

Illustrative of the organic cationic compounds are the following basic dyes: Basic Black CSP, Methylene Blue, Victoria Blue B Ex. Conc., Calco Victoria Pure Blue BO, Basic Blue FN Ex. Conc. Dustless, Brilliant Blue 2R Conc., Bismarck Brown RX Conc. Dustless, Bismarck Brown TDR Ex. Conc., Chrysoidine Y, Chrysoidine RS Dustless, Green MX, Green EN Conc. Crystals Dustless, Safranine GF Ex. Conc., Rhodamine BXP Conc., Rhodamine 6 GX, Methyl Violet, Violet 6 BN Powder, Ethyl Violet, Auramine OO, and the like. These and other basic dyes are disclosed in "Dyestuff Data for Paper Makers," American Cyanamid Company, 1952, pp. 21–25 and in "University of Maine Lectures on Pulp and Paper Manufacture," 1950, pp. 241–245, the disclosures of which are incorporated herein by reference.

Illustrative of cationic germicides are cocodimethylbenzylammonium chloride, lauryl and other long-chain alkylpyridinium chlorides, octadecenyldimethylethylammonium chloride, octadecenyltrimethylammonium chloride, cetyltrimethylammonium bromide, cetyldimethylethylammonium bromide, cetyldimethylbenzylammonium bromide, various alkylisoquinolinium halides and alkyldimethyl-3,4-dichlorobenzylammonium chlorides, alkoxybenzylpyridinium chlorides, quaternized pyridinesulfonamides, and the like. These and other useful germicides are described in "Surface Active Agents and Detergents" by Schwartz et al., vol. II, 1958, pp. 210–227, which disclosure is incorporated herein by reference.

Other representative groups of water soluble or dispersible, functional cationic organic compounds useful with the treated fibrous materials are amino silanes for water proofing, cationic UV (ultraviolet) absorbing compounds for preventing sunlight degradation of fabrics, cationic optical brighteners, cationic fluorinated compounds for imparting water repellency, cationic phosphorus and halogenated materials for imparting flame proofing to fabrics and fibers, and the like.

The embodiments of the invention in which an exclusive property or privilege is claimed are defined as follows:

1. The process of treating cotton fibrous materials which comprises impregnating the said materials with (1) an aqueous dispersion of an acid or alkali metal montmorillonite clay and then (2) an aqueous solution or dispersion of a polyamine or a polyquaternary ammonium compound, the clay being retained by the fibrous materials in an amount up to about 0.2% by weight based on the dry weight of the fibrous materials and the polyamine or polyquaternary ammonium compound being used in an amount sufficient to satisfy at least a portion of the base exchange capacity of the clay.

2. The process of claim 1 wherein the fibrous materials are further (3) impregnated with an aqueous dispersion of an acid or alkali metal montmorillonite clay.

3. The process of claim 2 wherein the impregnations (2) and (3) are alternately repeated.

4. The process of claim 3 wherein the alternating impregnations are repeated up to about 10 times.

5. The process of claim 1 wherein the polyamine is a polyalkylene imine of the formula:

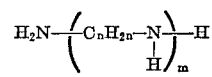

where $n$ is 2 or 3 and $m$ is 2 to about 1500.

6. The process of claim 5 where $m$ is 50 to about 250 and $n$ is 2.

7. The process of claim 3 wherein the aqueous clay dispersions and the aqueous polyamine or polyquaternary ammonium compound solution or dispersion contain less than about 10% by weight of the clay and the polyamine or polyquaternary ammonium compound.

8. The process of claim 7 wherein the aqueous clay dispersions and the aqueous polyamine or polyquaternary ammonium compound solution or dispersion contain 0.25 to 5% by weight of the clay and polyamine or polyquaternary ammonium compound.

9. The process of claim 8 where the polyamine is a polyethylene imine of the formula:

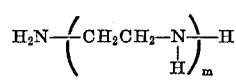

where $m$ is 50 to about 250 and the said imine is used in an amount of about 0.1 to 1.0% by weight based on the weight of the dry fibrous material.

10. The process of claim 9 wherein the clay is retained in an amount above about 0.2% by weight based on the dry weight of the fibrous materials.

11. The process of claim 10 where the clay is sodium montmorillonite and the fibrous material is cotton cloth.

12. The process of claim 11 where the impregnations are carried out at room temperature for about five minutes.

13. The process of claim 1 wherein the treated fibrous material is further impregnated with a functional anionic organic compound.

14. The process of claim 3 wherein the last impregnation is with the polyamine or polyquaternary ammonium compound solution or dispersion.

15. The process of claim 14 wherein the treated fibrous material is further impregnated with a functional anionic organic compound.

16. The process of claim 3 wherein the treated fibrous material is further impregnated with a functional cationic organic compound.

17. A softened fibrous cotton material comprising the product of cotton material, an acid or alkali metal montmorillonite clay and a polyamine or a polyquaternary ammonium compound.

References Cited

UNITED STATES PATENTS

| | | | |
|---|---|---|---|
| 2,213,643 | 9/1940 | Alton | 117—139.5 |
| 2,334,764 | 11/1943 | Henke et al. | 117—139.5 |
| 2,403,960 | 7/1946 | Stoops et al. | 117—139.5 |
| 2,622,307 | 12/1952 | Cogovan et al. | 117—169 |
| 3,063,128 | 11/1962 | Etchison | 117—139.5 |

WILLIAM D. MARTIN, Primary Examiner

T. G. DAVIS, Assistant Examiner

U.S. Cl. X.R.

117—62.1, 139.5, 143, 169